United States Patent
Won et al.

(10) Patent No.: US 9,223,495 B2
(45) Date of Patent: Dec. 29, 2015

(54) SYSTEM AND METHOD FOR CROSSING NAVIGATION FOR USE IN AN ELECTRONIC TERMINAL

(75) Inventors: Sohui Won, Sunnyvale, CA (US); Eui-Suk Chung, Cupertino, CA (US); Bartley H. Calder, San Jose, CA (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 17 days.

(21) Appl. No.: 13/360,490

(22) Filed: Jan. 27, 2012

(65) Prior Publication Data

US 2012/0242598 A1    Sep. 27, 2012

Related U.S. Application Data

(60) Provisional application No. 61/467,838, filed on Mar. 25, 2011.

(51) Int. Cl.
*G06F 3/048*     (2013.01)
*G06F 3/0488*    (2013.01)

(52) U.S. Cl.
CPC ........ *G06F 3/04883* (2013.01); *G06F 3/04886* (2013.01)

(58) Field of Classification Search
None
See application file for complete search history.

(56) References Cited

U.S. PATENT DOCUMENTS

| | | | |
|---|---|---|---|
| 7,703,043 B2 | 4/2010 | Utsuki et al. | |
| 8,413,065 B2 * | 4/2013 | Horodezky | 715/772 |
| 2004/0233239 A1 | 11/2004 | Lahdesmaki | |
| 2005/0210416 A1 * | 9/2005 | MacLaurin et al. | 715/851 |
| 2006/0069997 A1 | 3/2006 | Hsieh et al. | |
| 2007/0067272 A1 | 3/2007 | Flynt et al. | |
| 2008/0024444 A1 * | 1/2008 | Abe et al. | 345/157 |
| 2008/0066010 A1 | 3/2008 | Brodersen et al. | |
| 2008/0204424 A1 | 8/2008 | Jin et al. | |
| 2009/0064055 A1 | 3/2009 | Chaudhri et al. | |
| 2009/0085886 A1 | 4/2009 | Huang et al. | |
| 2010/0023858 A1 | 1/2010 | Ryu et al. | |
| 2010/0103124 A1 | 4/2010 | Kruzeniski et al. | |
| 2010/0105370 A1 | 4/2010 | Kruzeniski et al. | |
| 2010/0211872 A1 | 8/2010 | Rolston et al. | |
| 2011/0296351 A1 * | 12/2011 | Ewing et al. | 715/841 |

OTHER PUBLICATIONS

Partial European Search Report dated Dec. 14, 2012 in connection with European Patent Application No. 12161011.7.
European Office Action dated Oct. 9, 2014 in connection with European Patent Application No. 12161011.7, 5 pages.
European Office Action dated Apr. 22, 2015 in connection with European Patent Application No. 12161011.7; 9 pages.
European Office Action dated Nov. 12, 2015 in connection with European Patent Application No. 12161011.7; 7 pages.

* cited by examiner

*Primary Examiner* — Joseph Haley

(57) ABSTRACT

A touch screen that is capable of receiving touch inputs from a user includes a crossing navigation input that uses two directional input to move through content within different content groups. The touch screen includes a graphical user interface that is configured to display content on the touch screen such that similar content items are in a content group. Additionally, the graphical user interface is configured to receive, through the touch screen, a first input to access different content groups and a second input to access content within the same group. The first input includes a touch input in a first direction and the second input includes a touch input in a second direction.

20 Claims, 16 Drawing Sheets

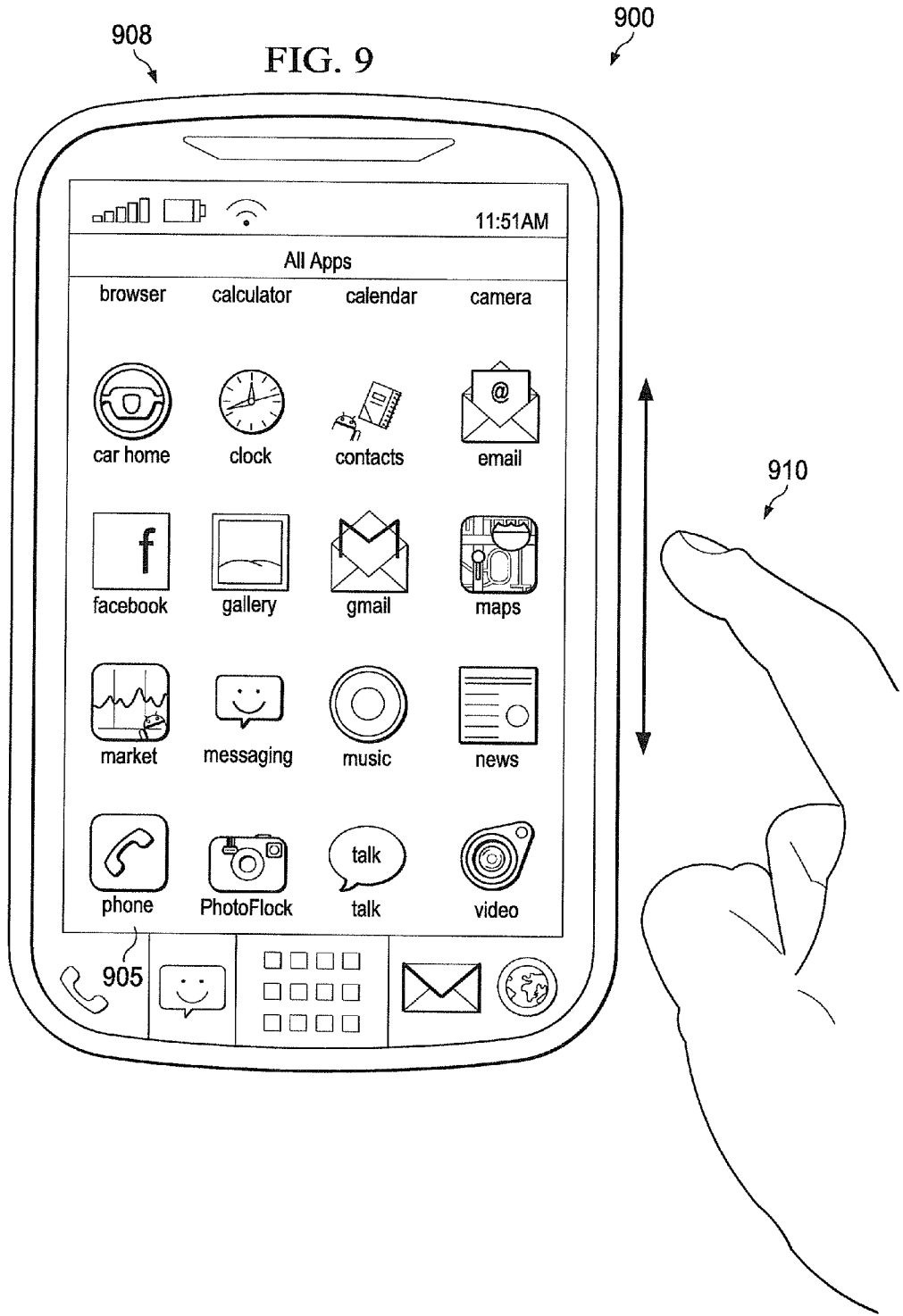

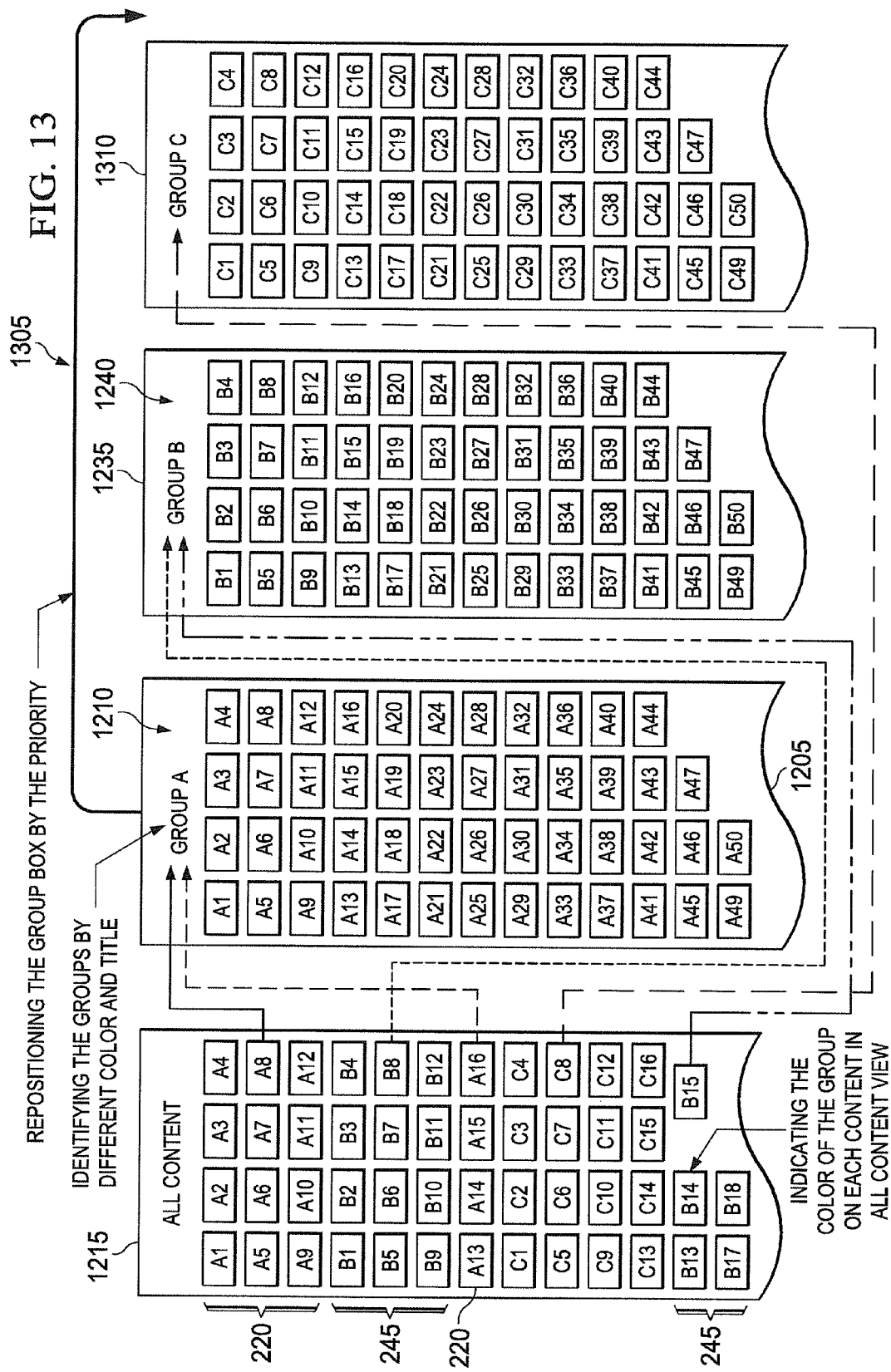

SYSTEM AND METHOD FOR CROSSING NAVIGATION FOR USE IN AN ELECTRONIC TERMINAL

CROSS-REFERENCE TO RELATED APPLICATION(S) AND CLAIM OF PRIORITY

The present application is related to U.S. Provisional Patent Application No. 61/467,838, filed Mar. 25, 2011, entitled "TOUCH SCREEN DEVICE USING CROSSING NAVIGATION USER INTERFACE". Provisional Patent Application No. 61/467,838 is assigned to the assignee of the present application and is hereby incorporated by reference into the present application as if fully set forth herein. The present application hereby claims priority under 35 U.S.C. §119(e) to U.S. Provisional Patent Application No. 61/467,838.

TECHNICAL FIELD OF THE INVENTION

The present application relates generally to electronic terminals and, more specifically, to a system and method for managing content in electronic terminals.

BACKGROUND OF THE INVENTION

Portable devices, such as smart phones, are capable of performing telephone calls as well as other functions, such as displaying email, playing music, and the like. The smart phones can also include a touch screen display.

The smart phones are capable of storing and executing a number of software applications ("APPS"). As these smart phones have become more popular, APP designers have begun designing more and more applications for use in the smart phones. Currently, thousands of APPS exist for these smart phones. Accordingly, in recent years there has been an explosion in the number of applications for touch screen-enabled devices, such as advanced mobile phones, laptop computers and PDA devices. It is estimated that over 350,000 such applications exist and the number is continuously growing.

SUMMARY OF THE INVENTION

A touch screen capable of receiving touch inputs from a user is provided. The touch screen includes a graphical user interface. The graphical user interface is configured to display content on the touch screen. The graphical user interface is configured to display similar content items in a content group. Additionally, the graphical user interface is configured to receive, through the touch screen, a first input to access different content groups and a second input to access content with a same group. The first input includes a touch input in a first direction and the second input includes a touch input in a second direction.

A wireless communications device is provided. The wireless communications device includes a touch screen display. The touch screen display is configured to receive touch inputs from a user and display content. The wireless communications device also includes a graphical user interface. The graphical user interface is configured to cause the touch screen to display content. The graphical user interface is configured to display similar content items in a content group. Additionally, the graphical user interface is configured to receive, through the touch screen, a first input to access different content groups and a second input to access content with a same group. The first input includes a touch input in a first direction and the second input includes a touch input in a second direction.

A method for managing a display of content on a touch screen display of the wireless communications device is provided. The method includes receiving a first touch input in a first direction from a user of the wireless communications device. The method also includes changing content groups displayed on the touch screen display in response to the first input. Further, the method includes receiving a second touch input in a second direction from the user; and changing, in response to the second input, content within a currently displayed content group, wherein similar content items are located within a same content group.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates an extendable content grouping display according to embodiments of the present disclosure;

FIGS. 12 and 13 illustrate an identification and personalization operation of the GUI according to embodiments of the present disclosure.

DETAILED DESCRIPTION OF THE INVENTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic terminal.

As stated herein above, it is estimated that over 350,000 such applications exist and the number is continuously growing. However, if a large number of applications are installed on a touch screen-enabled device, it becomes increasingly difficult for the user to manage all of the screen content in the graphical user interface.

A touch screen-enabled device typically has a limited space to organize content. Once a certain number of items are displayed on the screen, there is no additional available space in which to display more items. In such a case, the user interface (UI) must create a new page, which generally reduces the user ability to flexibly interact with the content.

Additionally, using a touch screen-enabled device the user has a limited ability (e.g., one directional interaction with content) to interact with different levels of content. A typical touch screen user interface (UI) space is divided in a certain way, so that the user cannot flexibly bring different levels of content into the same level according to the priority of the user.

Furthermore, the user typically is limited in their ability to identify or personalize content. A conventional touch screen UI limits the personalization of content. A user typically is limited to making folders and changing titles on the phone.

Therefore, there is a need to support advanced and unique users as mobile applications and activities increase in number and complexity. The present invention provides an improved graphical user interface that is capable of organizing a very large amount of content, identifying different types of content, and personalizing the content of the user.

Figure 1:
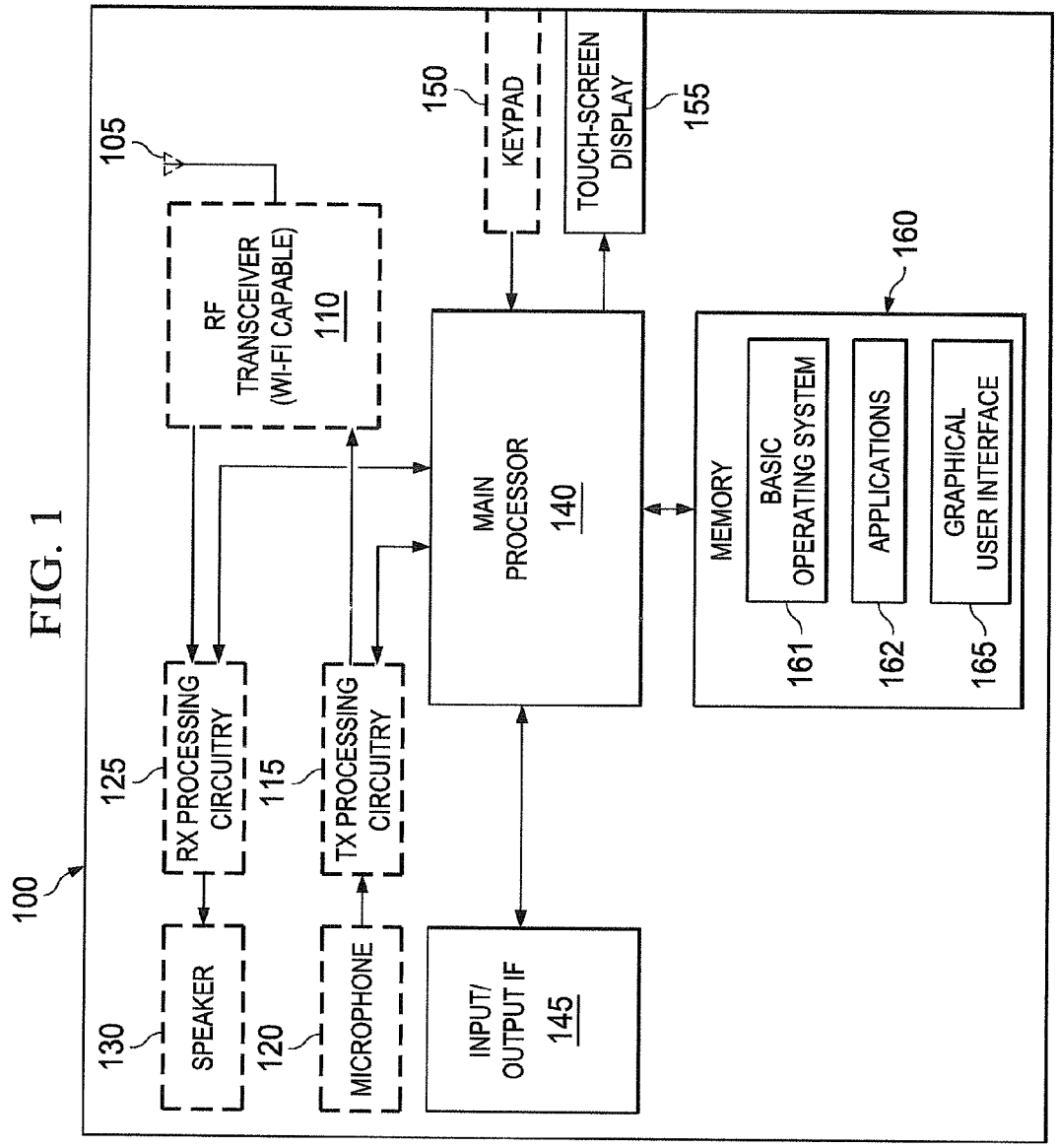
FIG. 1 illustrates a touch-screen enabled electronic terminal according to embodiments of the present disclosure.

FIG. 1 illustrates a touch-screen enabled electronic terminal according to embodiments of the present disclosure. The embodiment of the touch-screen enabled electronic terminal shown in FIG. 1 is for illustration only. Other embodiments could be used without departing from the scope of this disclosure.

Touch-screen enabled electronic terminal (hereinafter "touch-screen device") 100 may be any touch screen-enabled device, such as a laptop computer, a personal computer with a touch screen, a tablet device, an electronic reading device, a touch screen display, a cell phone, a personal digital assistant (PDA) device equipped with a wireless modem, a two-way pager, a personal communication system (PCS) device, or any other type of wireless mobile station Touch-screen device 100 includes antenna 105, radio frequency (RF) transceiver 110, transmit (TX) processing circuitry 115, microphone 120, and receive (RX) processing circuitry 125. SS 100 also comprises speaker 130, main processor 140, input/output (I/O) interface (IF) 145, keypad 150, touch-screen display 155, and memory 160. Memory 160 further comprises basic operating system (OS) program 161 and a plurality of applications 162.

Radio frequency (RF) transceiver 110 receives from antenna 105 an incoming RF signal transmitted by a base station of a wireless network. Radio frequency (RF) transceiver 110 down-converts the incoming RF signal to produce an intermediate frequency (IF) or a baseband signal. The IF or baseband signal is sent to receiver (RX) processing circuitry 125 that produces a processed baseband signal by filtering, decoding, and/or digitizing the baseband or IF signal. Receiver (RX) processing circuitry 125 transmits the processed baseband signal to speaker 130 (i.e., voice data) or to main processor 140 for further processing (e.g., web browsing).

Transmitter (TX) processing circuitry 115 receives analog or digital voice data from microphone 120 or other outgoing baseband data (e.g., web data, e-mail, interactive video game data) from main processor 140. Transmitter (TX) processing circuitry 115 encodes, multiplexes, and/or digitizes the outgoing baseband data to produce a processed baseband or IF signal. Radio frequency (RF) transceiver 110 receives the outgoing processed baseband or IF signal from transmitter (TX) processing circuitry 115. Radio frequency (RF) transceiver 110 up-converts the baseband or IF signal to a radio frequency (RF) signal that is transmitted via antenna 105.

In some embodiments, main processor 140 is a microprocessor or microcontroller. Memory 160 is coupled to main processor 140. Memory 160 may be comprised of solid-state memory such as random access memory (RAM), various types of read only memory (ROM), or Flash RAM. Memory 160 may also include other types of memory such as micro-hard drives or removable storage media that stores data. According to some embodiments, part of memory 160 comprises a random access memory (RAM) and another part of memory 160 comprises a Flash memory, which acts as a read-only memory (ROM). Memory 160 stores the core software that provides the basic operational control of touch-screen device 100.

Main processor 140 executes basic operating system (OS) program 161 stored in memory 160 in order to control the overall operation of touch-screen device 100. In one such operation, main processor 140 controls the reception of forward channel signals and the transmission of reverse channel signals by radio frequency (RF) transceiver 110, receiver (RX) processing circuitry 125, and transmitter (TX) processing circuitry 115, in accordance with well-known principles.

Main processor 140 is also capable of executing graphical user interface (GUI) program 165 and other processes and programs (not shown) that are resident in memory 160, such as operations for operating touch-screen display 155 and managing and navigating content. Main processor 140 can move data into or out of memory 160, as required by an executing process. In some embodiments, the main processor 140 is configured to execute a plurality of applications 162, such as applications for channel measurement for radio link monitoring. For example, the main processor 140 is configured to execute a plurality of applications 162 to control touch-screen display 155, navigate content, manage content, and so forth. The main processor 140 can operate the plurality of applications 162 based on OS program 161. Main processor 140 is also coupled to I/O interface 145. I/O interface 145 provides touch-screen device 100 with the ability to connect to other devices such as laptop computers and handheld computers. I/O interface 145 is the communication path between these accessories and main controller 140.

In some embodiments, touch-screen device 100 includes keypad 150 as well as touch-screen display 155. In some embodiments, keypad 150 is included within and displayed by touch-screen display 155. Main processor 140 is coupled to keypad 150 and touch-screen display 155. In some embodiments, the operator of touch-screen device 100 uses keypad 150 to enter data into touch-screen device 100.

Main processor 140 is coupled to touch-screen display 155. In some embodiments, main processor 140 may also be coupled to keypad 150. Touch-screen display 155 is used by the end-user of the mobile station to enter data into device 100. Touch screen 155 is capable of rendering text and/or at least limited graphics, including graphics from web sites.

Touch screen 155 may be implemented as a liquid crystal diode (LCD) display, a light emitting diode (LED) display, and such. Alternate embodiments use other types of displays. Touch-screen display 155 is a hardware interface with which a user can input data and commands and select or launch applications that are resident in memory 160. Alternate embodiments may use other types of displays.

Embodiments of the present disclosure enable the cross-navigation of groups of content. The operation of cross-navigation utilizes two directional inputs to enable the user of the touch-screen device 100 to navigate through numerous applications and widgets (content) sorted in groups. For example, the user can input a first directional input to sort through the groups; then the user can input a second direction input, different from the first directional input, to sort through the content within the selected group.

Under the control of GUI program 165, processor 140 executes the graphical user interface as further illustrated in FIGS. 2 through 8. The GUI program 165 provides a multi-dimensional, two-dimension (2D) or three-dimension (3D) technique (that is, cross-navigation) for managing different levels of content into the same group or different groups and identifying and personalizing the user content. In an exemplary embodiment, GUI program 165 operates on the home user interface of the touch screen device 100 and provides a quick access window as a second pop-up.

Figure 2:
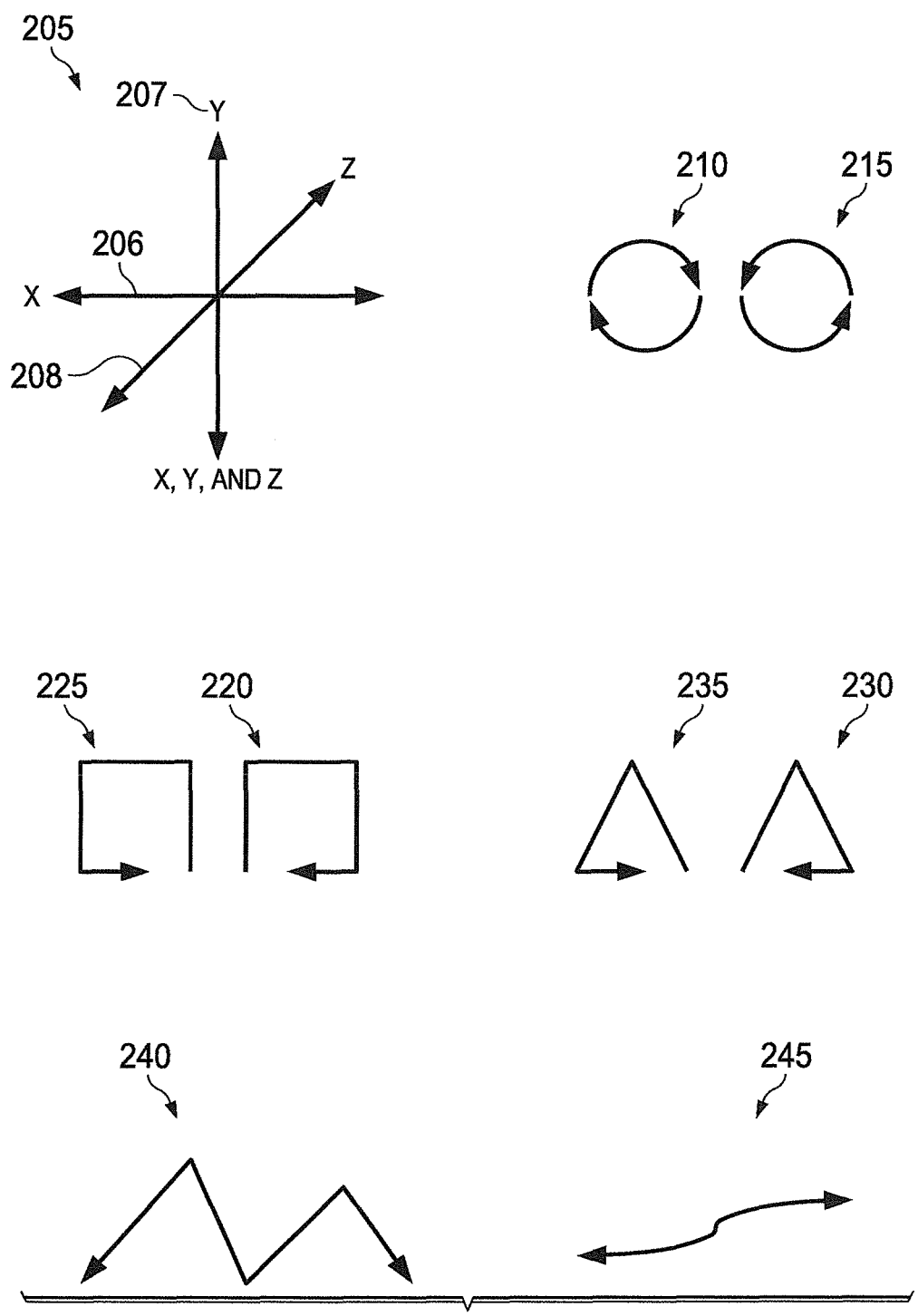
FIG. 2 illustrates various input directions for use in cross-navigation operation according to embodiments of the present disclosure.

FIG. 2 illustrates various input directions for use in cross-navigation operation according to embodiments of the present disclosure. The embodiments of the input directions shown in FIG. 2 are for illustration only. Other embodiments could be used without departing from the scope of this disclosure.

The GUI 165 is configured to accept multiple variations of input directions. The GUI 165 can be 3 dimensional and include multiple flow-able shapes and directions that may be used in 3-dimensions (3-D). Any combination of flow-able directions is available for cross navigation operation.

The directions can be Cartesian, such as in the X-Y-Z 205 directions. For example, a first input direction can be in the X 206 direction such that the user slides their finger horizontally along a face of the touch screen display 155. A second can be in the Y 207 direction such that the user slides their finger vertically along the face of the touch screen display 155. Additionally and alternatively, the first input can be in the X-direction 206 and the second input Z 208 direction such that the user slides their finger diagonally along the face of the touch screen display 155. It will be understood that illustration of the first input in the X-direction is exemplary only and the first input can be in any one of the X 206, Y 207 or Z 208 directions with the second input being in another of the X 206, Y 207 or Z 208 directions; with the second input direction being different than the first input direction.

The directions can be circular, such as in a clockwise 210 or a counter-clockwise 215 directions. For example, a first input direction can be in the clockwise 210 direction such that the user slides their finger in a circular clockwise motion along a face of the touch screen display 155. Additionally and alternatively, the first input direction can be in the counter-clockwise 215 direction such that the user slides their finger in a circular counter-clockwise motion along a face of the touch screen display 155. It will be understood that illustration of the circular directions 210, 215 as the first input is exemplary only and the circular inputs 210, 215 can used as the second input in various embodiments.

The directions can be square shaped, such as in a clockwise 220 or a counter-clockwise 225 directions. For example, a first input direction can be in the clockwise 220 direction such that the user slides their finger in a square clockwise motion along a face of the touch screen display 155. Additionally and alternatively, the first input direction can be in the counter-clockwise 225 direction such that the user slides their finger in a square counter-clockwise motion along a face of the touch screen display 155. It will be understood that illustration of the square directions 220, 225 as the first input is exemplary only and the square inputs 210, 215 can used as the second input in various embodiments.

The directions can be triangular shaped, such as in a clockwise 230 or a counter-clockwise 235 directions. For example, a first input direction can be in the clockwise 220 direction such that the user slides their finger in a triangular clockwise motion along a face of the touch screen display 155. Additionally and alternatively, the first input direction can be in the counter-clockwise 225 direction such that the user slides their finger in a triangular counter-clockwise motion along a face of the touch screen display 155. It will be understood that illustration of the triangular directions 220, 225 as the first input is exemplary only and the triangular inputs 210, 215 can used as the second input in various embodiments.

The directional inputs can also include non-shape specific inputs. For example, the directional inputs can include a zig-zag 240 and a curve 245 (e.g., squiggle) input.

Figure 3:
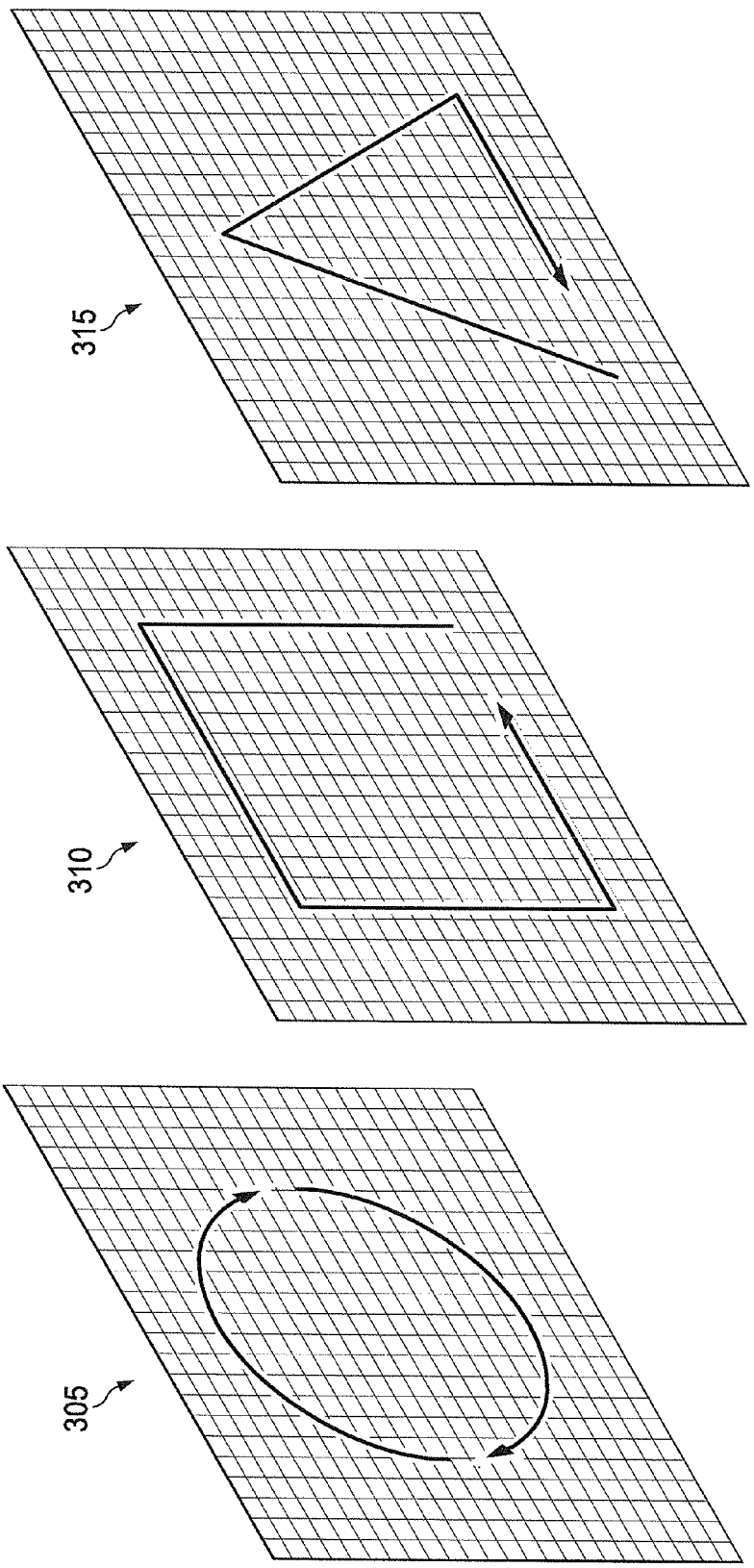
FIG. 3 illustrates a 3 dimensional input directions according to an exemplary embodiment of the disclosure.

In some embodiments, the GUI 165 uses the input directions to cross-navigate through 3-D. For example, the input directions can be used to navigate to items stored graphically behind or in front of an existing view. Examples of flow-able input directions are illustrated in FIG. 3. The GUI 165 can be configured to receive a circular 305, square 310 or triangular 315 input to rotate through three dimensions. It will be understood that illustration of the three inputs is exemplary only and other inputs can used in various embodiments.

Figure 4:
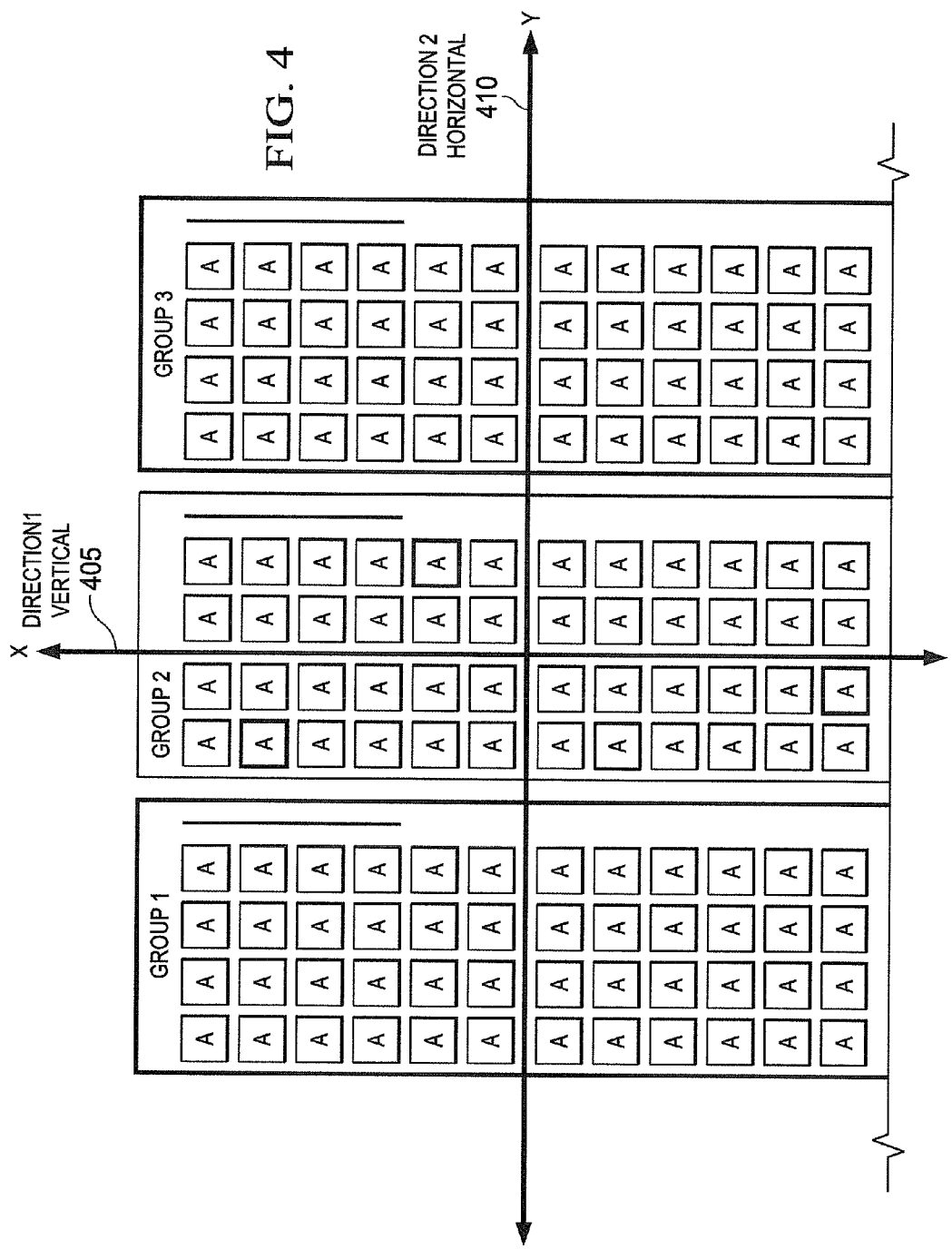
FIGS. 4 through 8 illustrate the cross-navigation operation of the GUI according to one embodiment of the invention.
Figure 5:
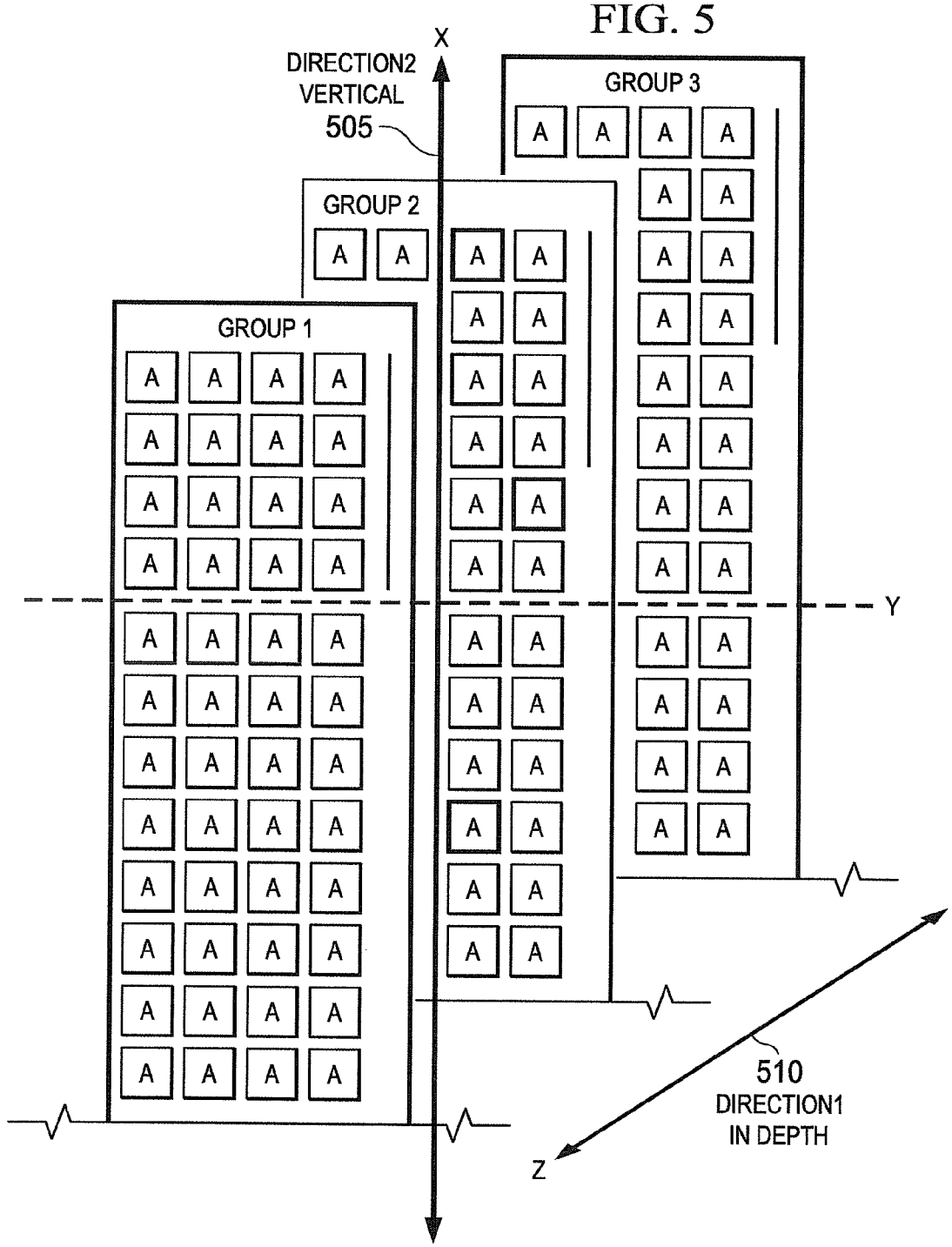

FIGS. 4 through 8 illustrate the cross-navigation operation of the GUI according to one embodiment of the invention. The embodiment of the cross-navigation operation shown in FIG. 4 is for illustration only. Other embodiments could be used without departing from the scope of this disclosure.

The GUI 165 can cause the display 155 to display content items continuously in a first (X) 405 direction (e.g., vertically) and content groups continuously in a second (Y) 410 direction (e.g., horizontally).

For example, the user of the touch-screen device 100 can slide their finger horizontally along the face of the display 155 in the Y 410 direction to access different content groups. Additionally, the user can slide their finger vertically along the face of the display 155 in the X 405 direction to access different content stored within the current (i.e., displayed) content group.

Additionally, the GUI 165 can cause the display 155 to display content items continuously in a first (X) 505 direction (e.g., vertically) and content groups continuously in a third (Z) 510 direction (e.g., in-depth).

For example, the user of the touch-screen device 100 can slide their finger diagonally along the face of the display 155 in the Z 510 direction to access different content groups. Additionally, the user can slide their finger vertically along the face of the display 155 in the X 505 direction to access different content stored within the current (i.e., displayed) content group.

Figure 6:
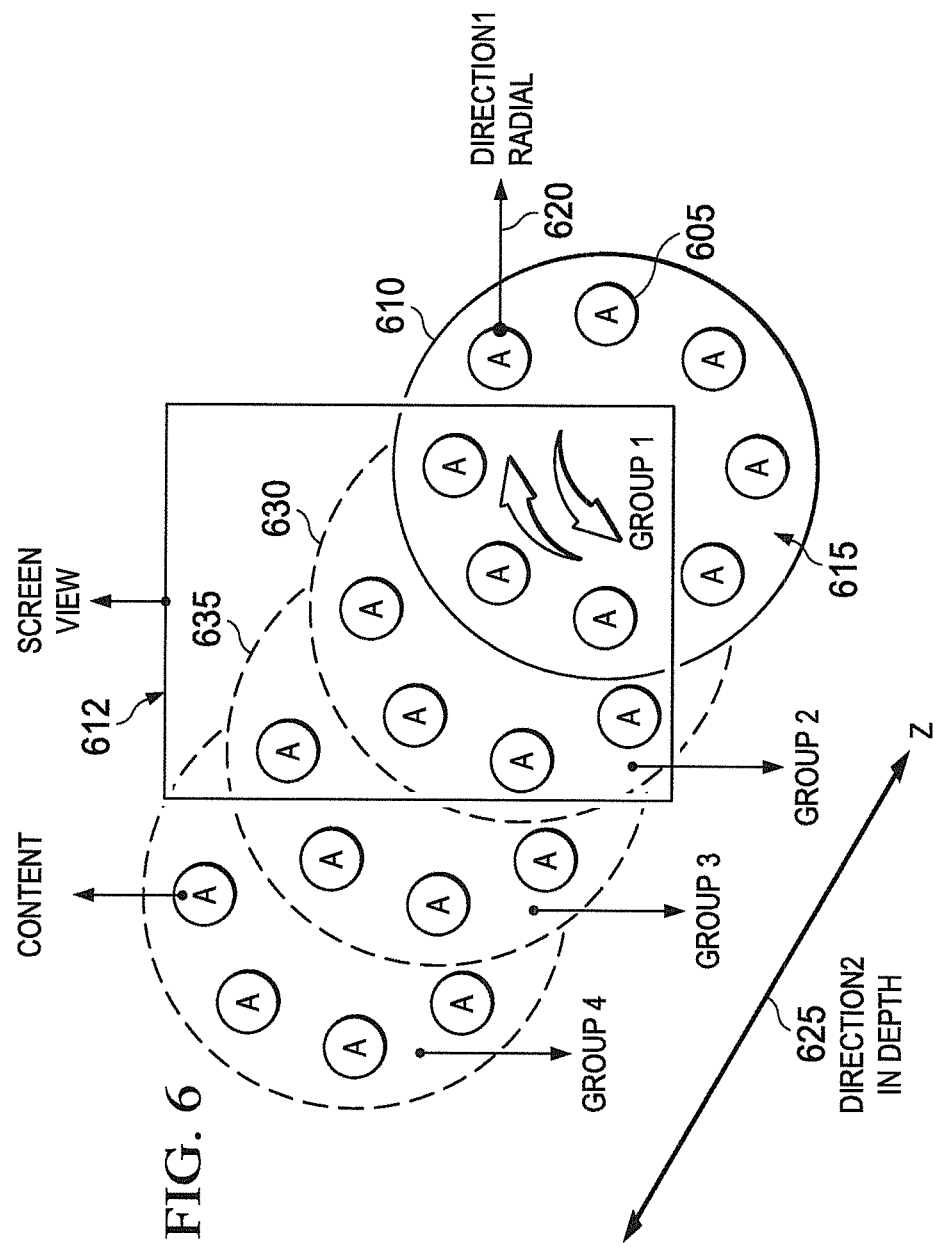

In some embodiments, as shown in FIG. 6, the GUI 165 is configured to receive at least one of the inputs as a shaped input, such as circular 210, 215, square 220, 225, and triangular 230, 235. The GUI 165 can cause the display 155 to display content items continuously in a first (X) direction (e.g., horizontally) and content groups continuously in a third (Z) direction (e.g., in-depth). However, the applications 605, labeled A, are depicted as round icons that reside in content groups that are shown as circular planes 610. Each content group plane 610 can be radially rotated to move a target application icon into the screen view area 612 (shown as a rectangle). Although FIG. 6 shows all the icons 605 in a content group, such as Group 1 615, a portion of the applications may not be displayed on display 155 (e.g., not located within screen view area 612) as a result of there being a large number of applications in content group 1 615. Therefore, as the user draws their finger in a circular motion 620, either clockwise 210 or counter clockwise 210, the applications radially rotate in the corresponding clockwise or counter clockwise directions. Accordingly, as the applications rotate radially, different ones of the applications are displayed via the touch-screen display 155.

Additionally, the content groups are stored in a 3-D relationship such that a first content group resides behind a second content group, and so forth. In some embodiments, the user can drag their finger diagonally, that is in the Z 625 direction to traverse through different content groups. As the user drags their finger in the Z 625 direction, different content groups are brought forward, such as, content group 1 615 to content group 2 630 to content group 3 635, and so forth. The user can cease the dragging motion when the desired content group is brought forward. The user can cycle through all the content groups by dragging their finger in one direction diagonally. Additionally, the user can cycle their finger back and forth diagonally to move to different content groups that are stored higher or lower than the displayed content group. The touch-screen display 155 can display the different content groups as the content groups are brought forward. The different content groups can be illustrated as a solid image or "ghosted" (i.e., somewhat transparent) until selected by the user. It will be understood that the use of ghosted content groups or applications is exemplary and other depictions could be used such as, but not limited to, shaking, highlighted, enlarged, and the like.

Figure 7:
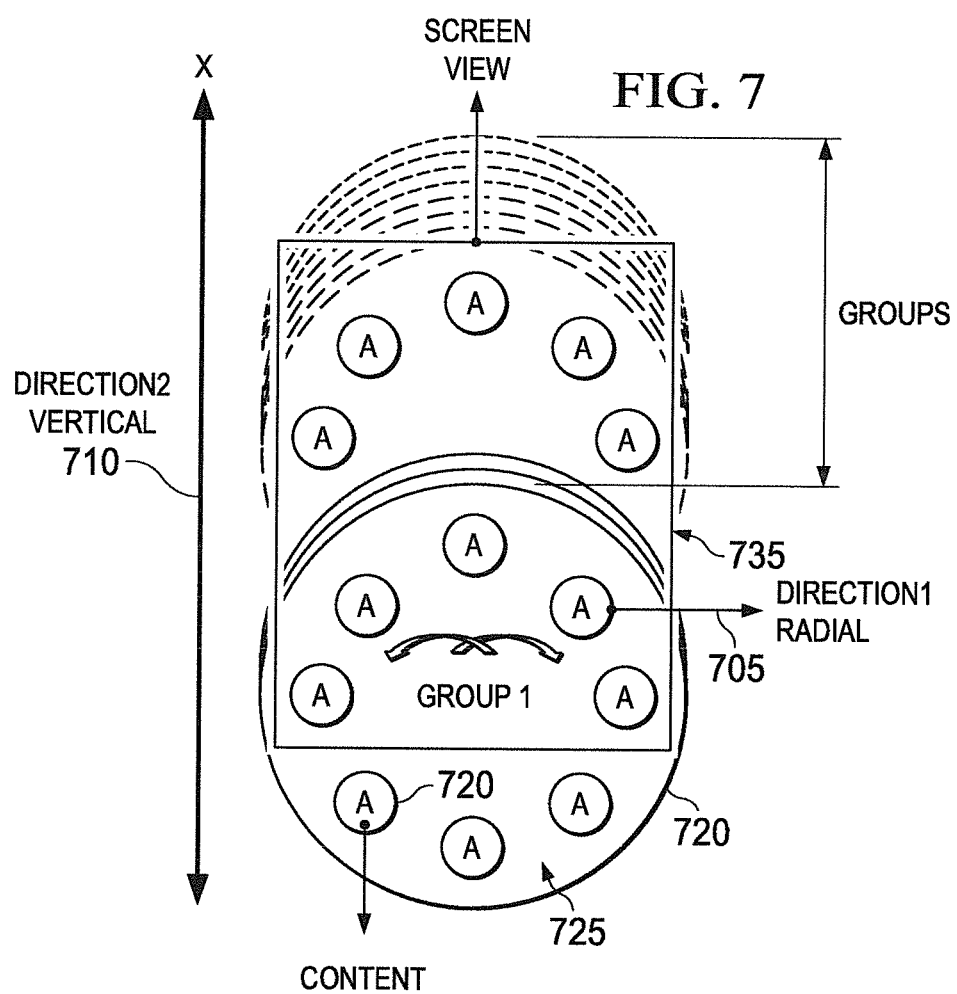

FIG. 7 illustrates another cross navigation operation of the GUI 165 according to embodiments of the present disclosure. The GUI displays content items continuously in a first (X) direction (e.g., horizontally) and content groups continuously in a second (Y) direction (e.g., vertically). The GUI 165 is configured to receive at least one of the inputs as a shaped input, such as circular 210, 215, square 220, 225, and triangular 230, 235. As in FIG. 6, applications (labeled A) are shown as round icons 715 that reside in content groups that are shown as vertically aligned circular planes 720. Each content group plane 720 can be radially rotated to move a target application icon 715 into the screen view area 735 (shown as a rectangle). Although FIG. 7 shows all the icons 715 in a content group, such as Group 1 725, a portion of the applications may not be displayed on display 155 (e.g., not located within screen view area 735) as a result of there being a large number of applications in content group 1 725. Therefore, as the user draws their finger in a circular motion 210, either clockwise 210 or counter clockwise 210, the applications radially rotate in the corresponding clockwise or counter clockwise directions. Accordingly, as the applications rotate radially, different ones of the applications are displayed via the touch-screen display 155.

Additionally, the content groups are stored in a 3-D relationship such that a first content group resides behind a second content group, and so forth. In some embodiments, the user can drag their finger vertically, that is in the Y 710 direction to traverse through different content groups. As the user drags their finger in the Y 710 direction, different content groups are brought forward, such as, content group 1 725 to content group 2 to content group 3, and so forth. The user can cease the dragging motion when the desired content group is brought forward. The user can cycle through all the content groups by dragging their finger in one direction vertically. Additionally, the user can cycle their finger back and forth vertically to move to different content groups that are stored higher or lower than the displayed content group. The touch-screen display 155 can display the different content groups as the content groups are brought forward. The different content groups can be illustrated as a solid image or "ghosted" (i.e., somewhat transparent) until selected by the user. It will be understood that the use of ghosted content groups or applications is exemplary and other depictions could be used such as, but not limited to, shaking, highlighted, enlarged, and the like.

Figure 8:
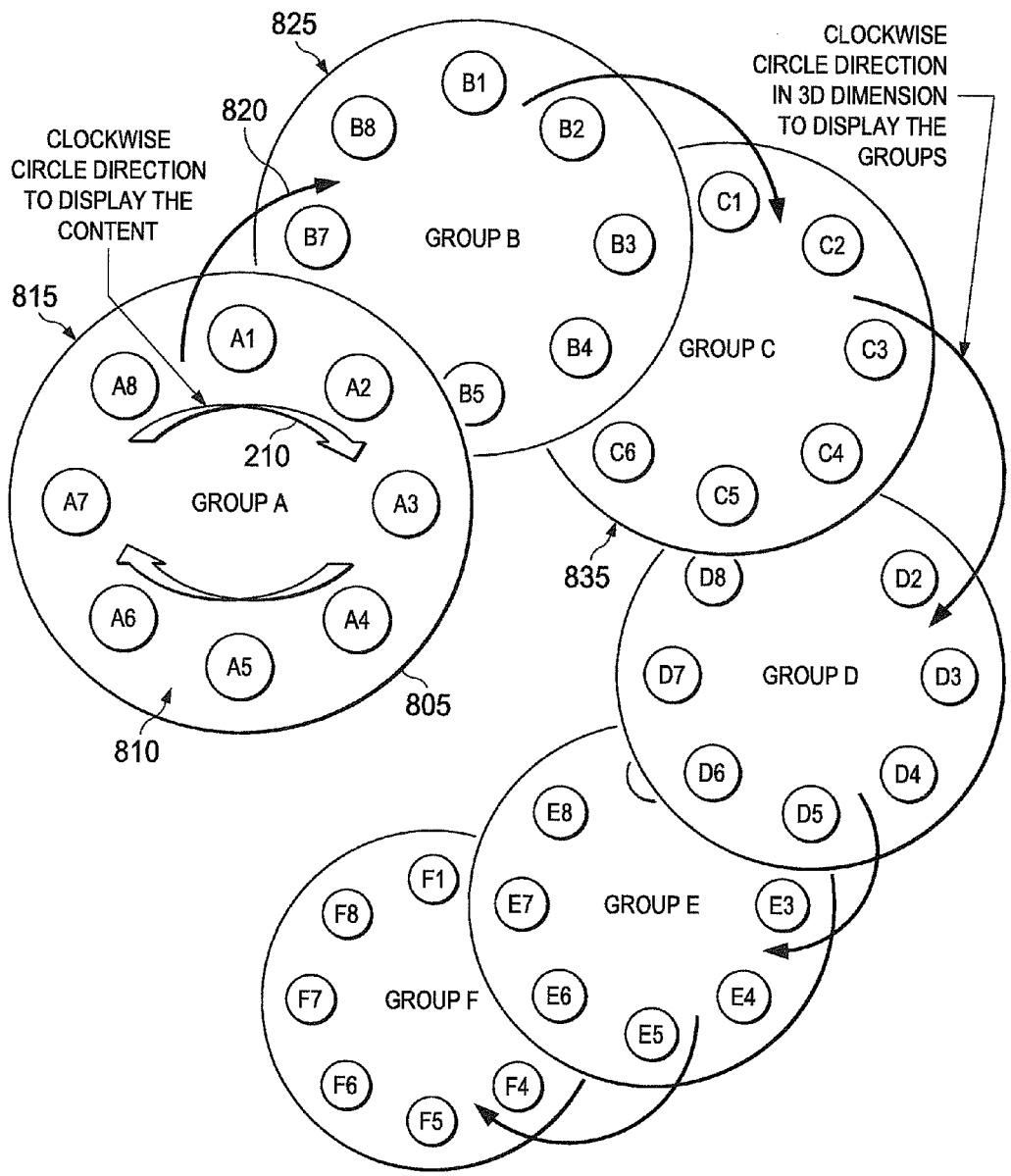

In some embodiments, as shown in FIG. 8, the GUI 165 is configured to receive at least one of the inputs as a shaped input, such as circular 210, 215, square 220, 225, and triangular 230, 235, to cycle through content within a content group and receive a second shaped (such as, but not limited to, curved) input to cycle through content groups. The GUI 165 can cause the display 155 to display content items continuously in a first (X) direction (e.g., horizontally) and content groups continuously in a third (Z) direction (e.g., in-depth). For example, the content groups can comprise circular planes 805 substantially similar to those illustrated in FIGS. 6 and 7. The GUI 165 is configured to receive at least one of the inputs as a shaped input, such as circular 210, 215, square 220, 225, and triangular 230, 235. As in FIG. 6, applications (labeled A) are shown as round icons 810 that reside in content groups that are shown as vertically aligned circular planes 805. Each content group plane can be radially rotated to move a target application icon 810 into the screen view area. Although FIG. 8 shows all the icons 810 in a content group, such as Group A 815, a portion of the applications may not be displayed on display 155 (e.g., not located within screen view area) as a result of there being a large number of applications in content group A 815. Therefore, as the user draws their finger in a circular motion 210, either clockwise 210 or counter clockwise 210, the applications radially rotate in the corresponding clockwise or counter clockwise directions. Accordingly, as the applications rotate radially, different ones of the applications are displayed via the touch-screen display 155.

Additionally, the content groups are stored in a 3-D relationship such that a first content group resides behind a second content group, and so forth. In some embodiments, the user can drag their finger in a circular diagonal 820 motion, away from the icons 810 located within the circular plan 805, that is, in a curved z 820 direction to traverse through different content groups. As the user drags their finger in the curved z 820 direction, different content groups are brought forward, such as, content group A 815 to content group B 825 to content group C 835, and so forth. The user can cease the dragging motion when the desired content group is brought forward. The user can cycle through all the content groups by dragging their finger in one direction vertically. Additionally, the user can cycle their finger back and forth along the curved diagonal arch to move to different content groups that are stored higher or lower than the displayed content group. The touch-screen display 155 can display the different content groups as the content groups are brought forward. The different content groups can be illustrated as a solid image or "ghosted" (i.e., somewhat transparent) until selected by the user. It will be understood that the use of ghosted content groups or applications is exemplary and other depictions could be used such as, but not limited to, shaking, highlighted, enlarged, and the like.

FIG. 9 illustrates an extendable content grouping display according to embodiments of the present disclosure. The embodiment of the grouping display 900 shown in FIG. 9 is for illustration only. Other embodiments could be used without departing from the scope of this disclosure.

In some embodiments, the GUI 165 is configured to display a plurality of Apps continuously in an extendable content area 905. The content area 905 extends vertically beyond the screen and the user can scroll continuously up and down through the content group. For example, all Apps can be displayed in an "ALL APPS" content group 908. The user can scroll through the content in the group 908 by sliding their finger vertically 910 along the display to move up and down through all the applications. Additionally, respective content groups can be configured to store items relative to that specific content group, such as work related applications in an "OFFICE APPS" content group; personal related apps in an "LIFESTYLE APPS" content group; banking and investment related apps in a "FINANCE APPS"; and so forth.

Figure 10A:
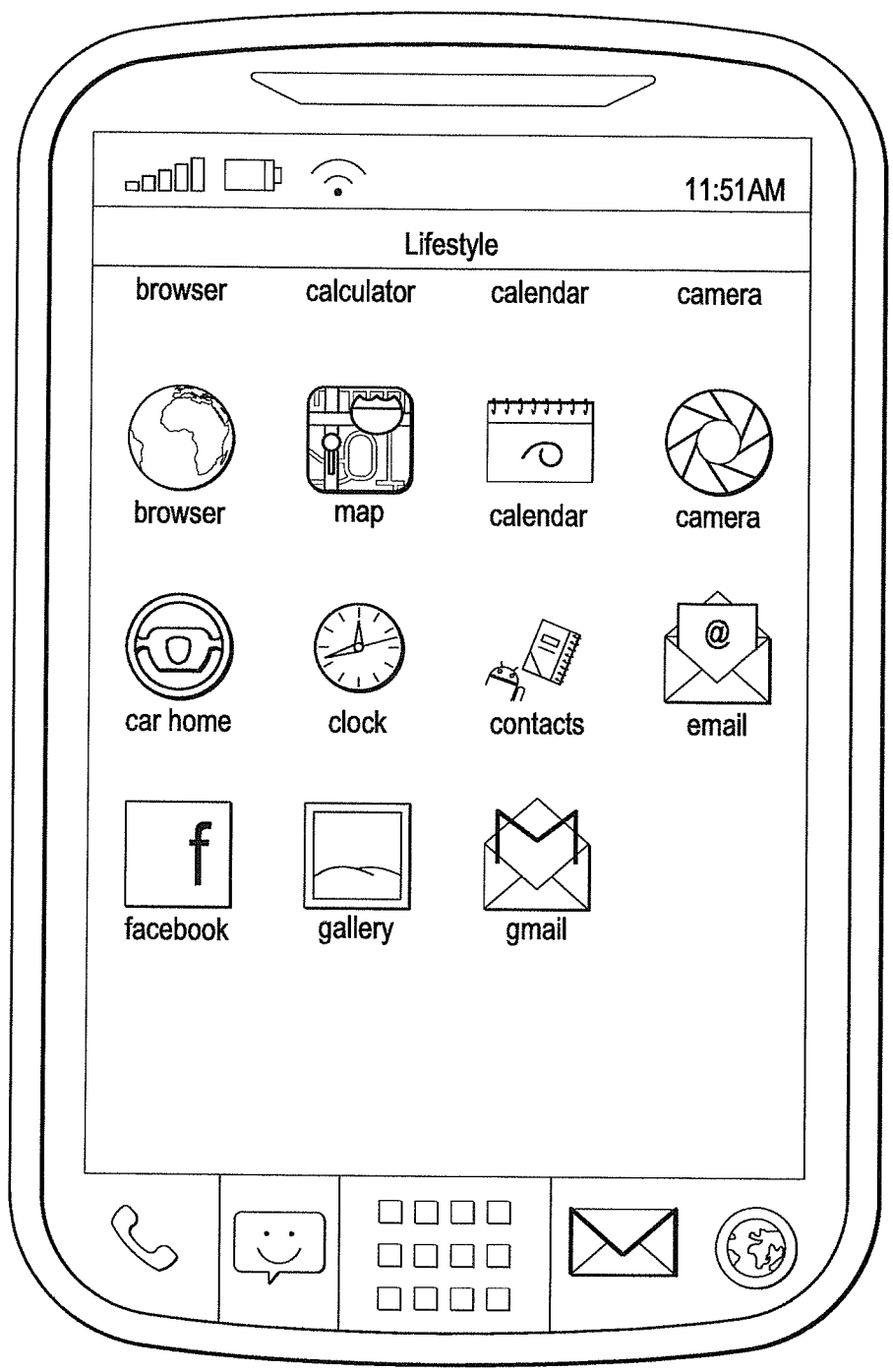
FIG. 10 illustrates navigation between content groups according to embodiments of the present disclosure.
Figure 10B:
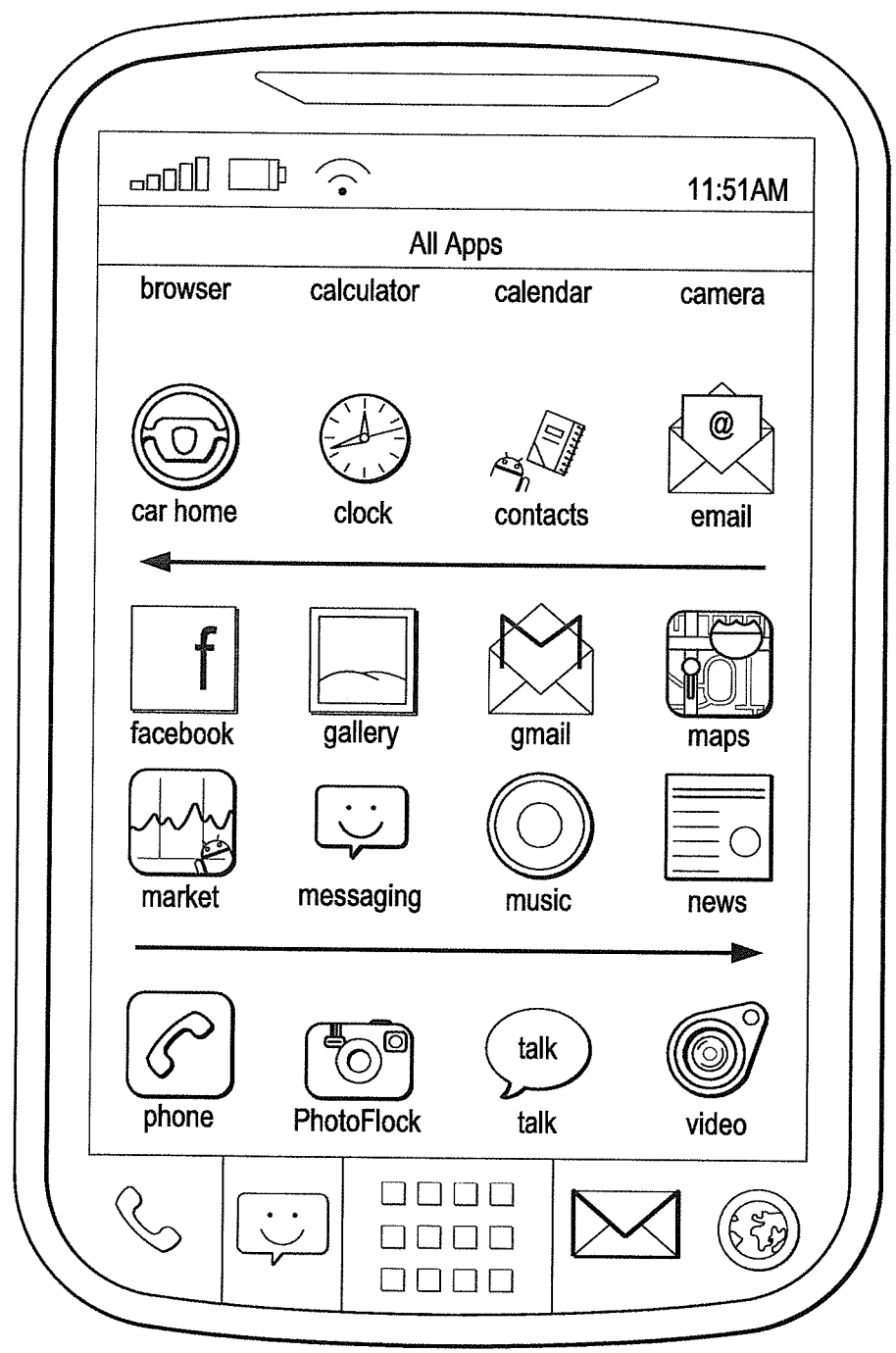
Figure 10C:
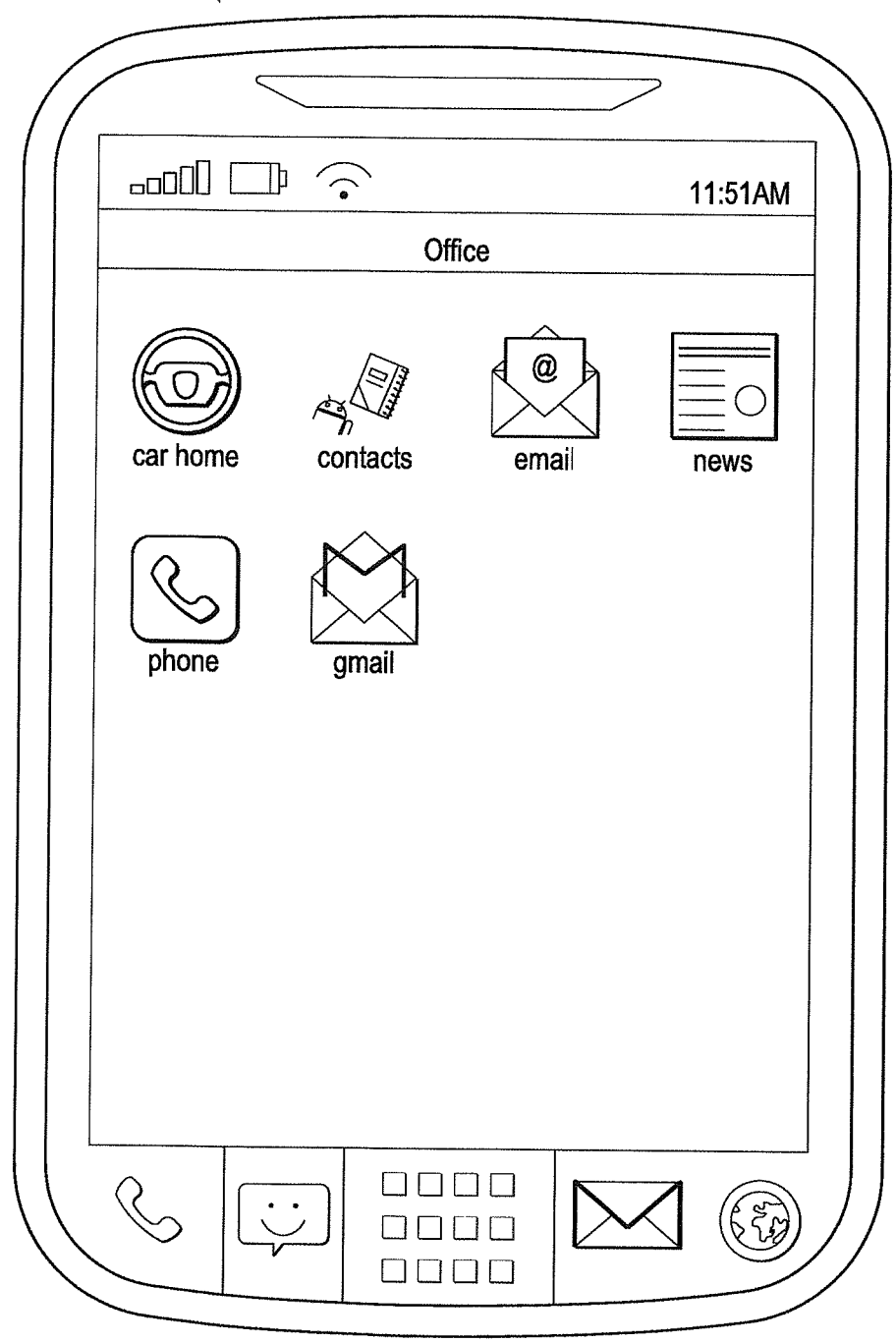

FIG. 10 illustrates navigation between content groups according to embodiments of the present disclosure. The embodiment of the content group navigation 1000 shown in FIG. 10 is for illustration only. Other embodiments could be used without departing from the scope of this disclosure.

The GUI 165 is configured to enable the user to use one of the two cross-navigation inputs to navigate between content groups. For example, while in an "ALL APPS" page 1005, the user can slide the GUI 165 to the right to go to the previous content group screen ("Lifestyle") 1010 or to the left to go to the next content group screen ("Office") 1015.

Figure 11:
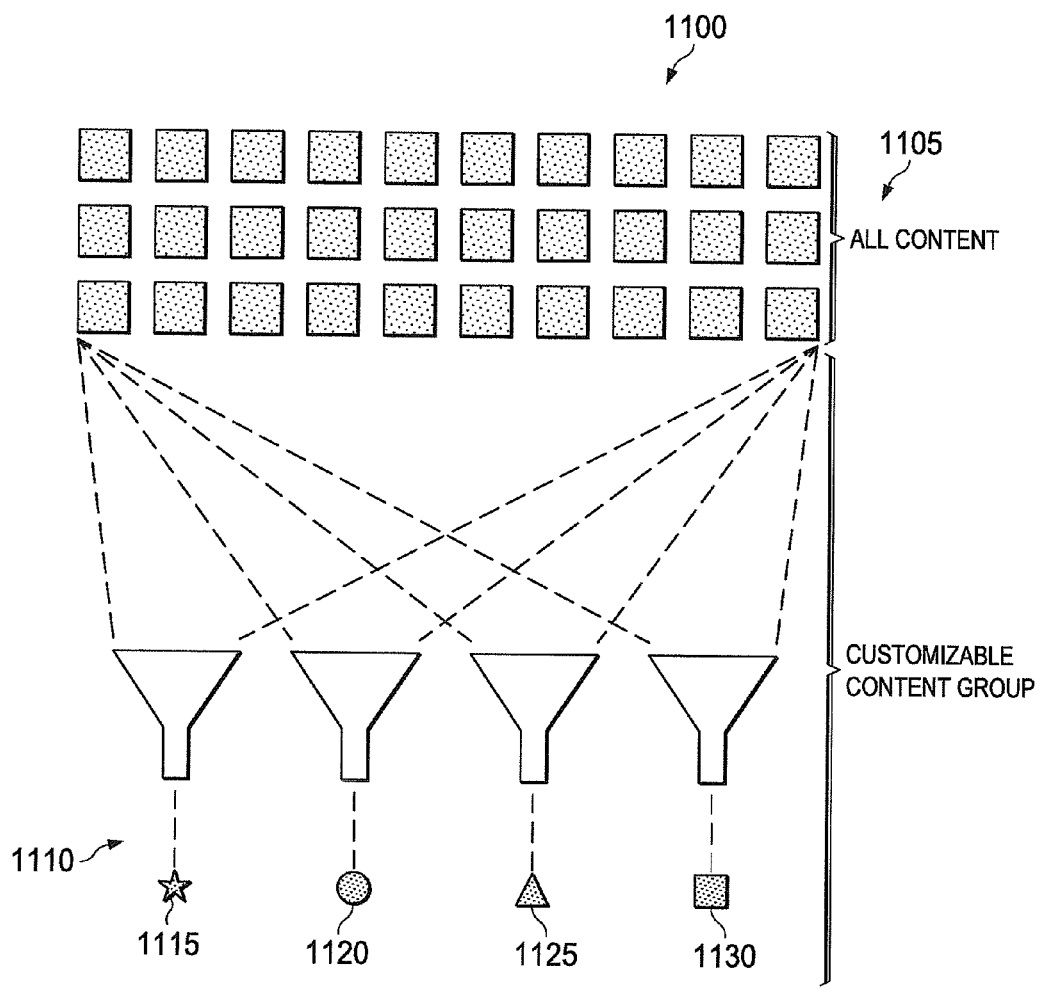
FIG. 11 illustrates a customization operation of the GUI according to embodiments of the present disclosure.

FIG. 11 illustrates a customization operation of the GUI according to embodiments of the present disclosure. The embodiment of the customization operation 1100 shown in FIG. 11 is for illustration only. Other embodiments could be used without departing from the scope of this disclosure.

In some embodiments, the user can customize the GUI 165 such that at least one content group includes mixed types of content. The mixed types of content can be configured into customizable content groups represented by different shapes, such as a star, a circle, and the like. Mixed types of interactive content include applications, widgets, detail features, buttons, titles, text, media, images, screenshots, and so forth. In some embodiments, the content in the mixed content group includes using shortcuts for content located in other content groups. In some embodiments, the mixed content is provided on the home screen of the display 155. Therefore, the user can reach favorite items in just one screen tap.

In some embodiments, the user can access the mixed content group by utilizing a specific shape input. For example, the user can access the mixed content group by entering a one of: a clockwise circular input 210, counter-clockwise circular input 215, a clockwise square input 220, a counter-clockwise square input 225, a clockwise triangular input 230, a counter-clockwise triangular input 235, zig-zag 240 and a curve 245 input. Thereafter, the user can select the content from the mixed content group via a tap, or the like.

The content 1105, such as all the content, can be selectively added to one or more mixed content groups 1110. For example, some of the content 1105, which is included in one or more of Groups A, B, C and D, can be selected to be in mixed content group 1 1115. Mixed content group 1 1115 can be displayed on the user's home page with a "star" icon. Additionally and alternatively, user can select the content in mixed content group 1 1115 by inputting a star-shaped input. In another example, some of the content 1105, which is included in one or more of Groups A, B, C and D, can be selected to be in mixed content group 2 1120. Mixed content group 2 1120 can be displayed on the user's home page with a "circle" icon. Additionally and alternatively, user can select the content in mixed content group 2 1120 by inputting a circular input. Furthermore, some of the content 1105 can be selected to be mixed content group 3 1125 or mixed content group 4 1130, or a combination mixed content group 1 1115, mixed content group 2 1120, mixed content group 3 1125 and mixed content group 4 1130. The user can select mixed content group 3 1125 by inputting a triangular shaped input and mixed content group 4 1130 by inputting a square shaped input.

Figure 12A:
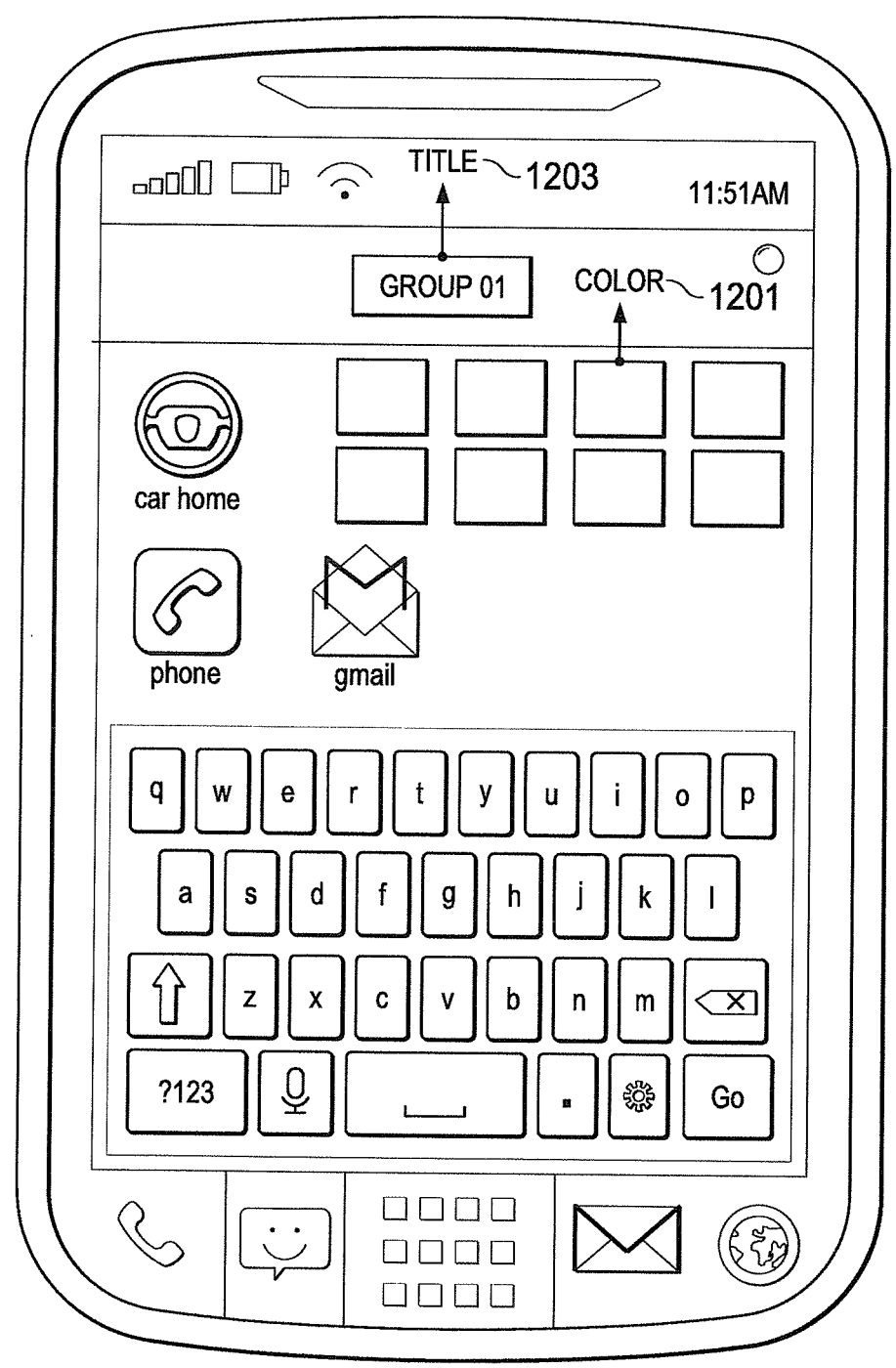
Figure 12B:
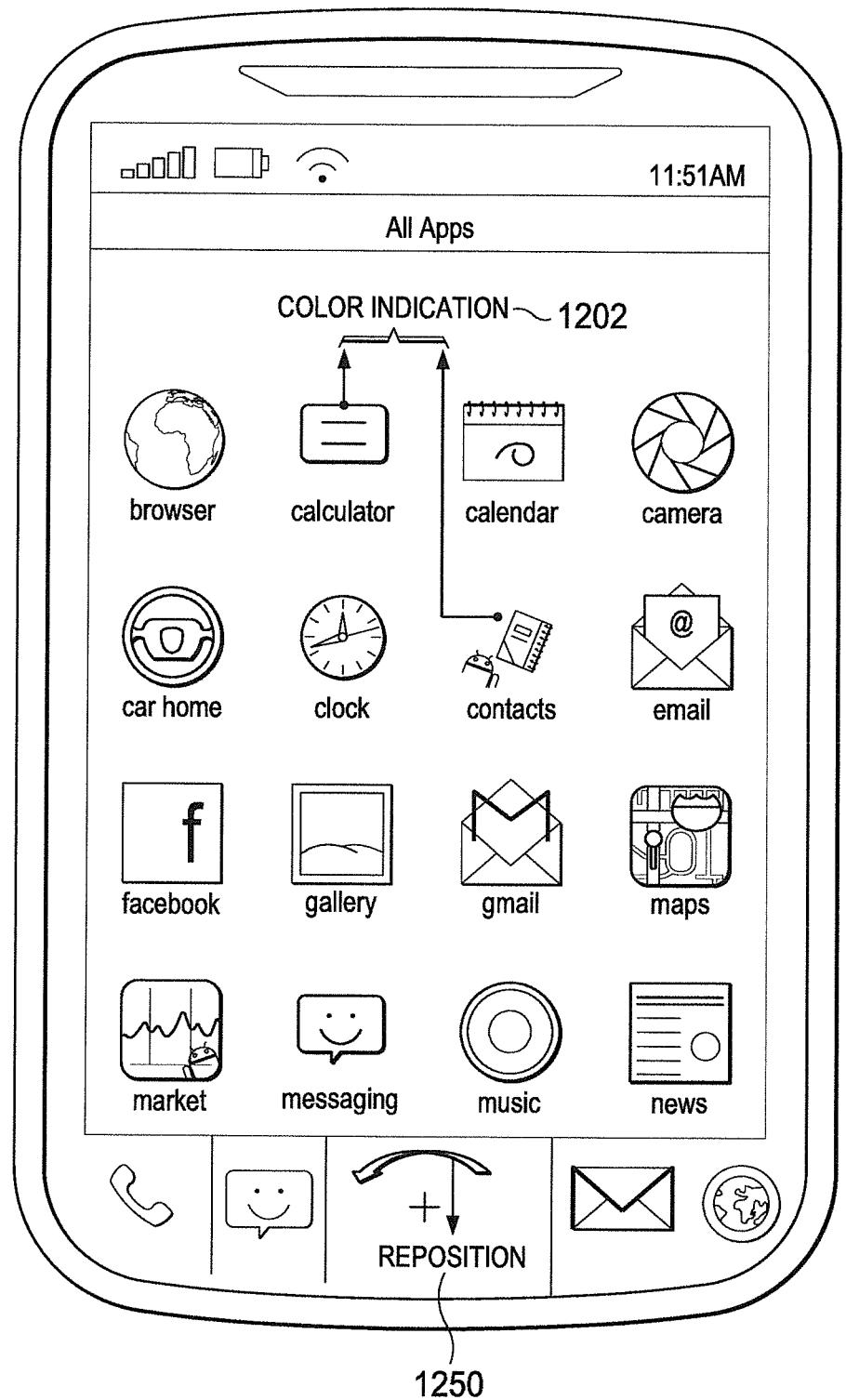

FIGS. 12 and 13 illustrate an identification and personalization operation of the GUI according to embodiments of the present disclosure. The embodiment of the identification and personalization operation 1200 shown in FIGS. 12 and 13 is for illustration only. Other embodiments could be used without departing from the scope of this disclosure.

In some embodiments, the GUI 165 can identify or personalizes the content or group using different colors, titles, functions, or a combination thereof. The user can specify content, such as a particular App, as belonging to a particular content group. For example, when the user downloads an application, the GUI 165 can prompt the user to indicate to which group the recently downloaded App will belong, such as Group A, Group B, Group C, and so forth. Thereafter, the recently downloaded App will be stored in the selected group. It will be understood that illustration of assigning a recently downloaded App to a group is exemplary and other examples could be used such as, but not limited to, changing the group of an existing App or specifying a group for an existing App, which was not previously assigned to a group.

In some embodiments, the GUI 165 is configured to assign a color 1201 to each group. For example, the GUI 165 can select colors randomly, by using a randomization color selection program, or some other color selection protocol. Additionally and alternatively, the GUI 165 can prompt the user to select a color 1201, such as from a color pallet. Thereafter, each group is assigned a color unique to that group, that is, each group is assigned a unique color. As such, the content located within a group is also assigned the color corresponding to that group. For example, if Group A 1205 is assigned the color "Red", then all Apps 1210 located in Group A are also assigned the color "Red." As such, when the user views the Apps in the "ALL APPS" page 1215, the GUI 165 can cause the Apps 1220 belonging to GROUP A 1205 to have a color indication 1202 such as being highlighted with a Red background. It will be understood that the use of background highlighting is exemplary and other depictions could be used such as, but not limited to, colored text, a colored corner, a colored shadow, a colored frame, and the like.

In some embodiments, the user can specify each group by a Title 1203. Therefore, rather than refer to groups and "Group B" or "Group 2", the user can indicate a group as "Office" or "Lifestyle" or some other title of their choosing. In some embodiments, the content located within a group is also assigned the Title corresponding to that group. For example, if Group B 1235 is assigned the Title "Office", then all Apps 1240 located in Group B 1235 ("Office") are also assigned the Title "Office." As such, when the user views the Apps in the "ALL APPS" page 1215, the GUI 165 can cause the Apps 1245 belonging to GROUP B 1235 to be highlighted with the Title "Office", such as, for example, in a portion of the icon for the App. It will be understood that the use of Title in a portion of the App is exemplary and other depictions could be used.

In some embodiments, the GUI 165 enables the user to reposition 1250 a group box by the priority of the user. The user can select a "priorities" option from a settings panel and specify an order for the group content pages. Therefore, the user can alter the order by which the user navigates through the group content pages. In some embodiments, the user can change group priorities by moving the group pages. The user can "drag" 1305 a group content page into a different position to alter the priority for that page. For example, the user can grab a corner of the Group A 1205 page and, upon indication that the page is ready to be moved, the user can drag 1305 the page backward to be behind Group C 1310 using one of the direction inputs described herein above. Alternatively, the user can drag 1305 one of the groups forward to be in front of one or more of the other groups.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communications device, a touch screen capable of receiving touch inputs from a user, the touch screen comprising:
    a graphical user interface configured to display content on the touch screen, wherein the graphical user interface is configured to
        display first similar content items in a first content group, the first similar content items comprising a first plurality of applications displayed within the first content group continuously in at least a radial direction,
        display second similar content items in a second content group, the second similar content items comprising a second plurality of applications displayed within the second content group continuously in at least a radial direction, and
        display at least a portion of the first similar content items and a portion of the second similar content items in a customizable content group,
    wherein the graphical user interface is configured to receive, through the touch screen, a first input to access different content groups, a second input to access content with a same group, and a third input to access the customizable content group, the first input comprising a touch input in a first direction, the second input comprising a touch input in a second direction, and the third input comprising a shape input.

2. The touch screen as set forth in claim 1, wherein at least one of the input directions comprises one of: a horizontal direction, a vertical direction and a diagonal direction and the other one of the input directions comprises a flow-able shape input.

3. The touch screen as set forth in claim 2, wherein the flow-able shape comprises one of: a circle, a square, a triangle, a zig-zag and a squiggle.

4. The touch screen as set forth in claim 1, wherein the graphical user interface is configured to create a number of customizable content groups, each of the customizable content groups comprising a mixed-content page, the mixed content page comprising content located in different content groups.

5. The touch screen as set forth in claim 4, wherein the graphical user interface is configured to cause a first customizable content group to display in response to an input of a first shape and a second customizable content group to display in response to an input of a second shape.

6. The touch screen as set forth in claim 1, wherein the graphical user interface is configured to assign at least one of: a unique color; and a title to each content group.

7. The touch screen as set forth in claim 6, wherein the graphical user interface is configured to assign the at least one of: the unique color of the content group; and the title the content group, to content within the content group.

8. A wireless communications device comprising:
    a touch screen display configured to receive touch inputs from a user and display content; and
    a graphical user interface configured to cause the touch screen to display content, wherein the graphical user interface is configured to:
    display first similar content items in a first content group, the first similar content items comprising a plurality of applications displayed within the first content group continuously in at least a radial direction,
        display second similar content items in a second content group, the second similar content items comprising a second plurality of applications displayed within the second content group continuously in at least a radial direction, and
    display at least a portion of the first similar content items and a portion of the second similar content items in a customizable content group,
    wherein the graphical user interface is configured to receive, through the touch screen, a first input to access different content groups, a second input to access content with a same group, and a third input to access the customizable content group, the first input comprising a touch input in a first direction, the second input comprising a touch input in a second direction, and the third input comprising a shape input.

9. The wireless communications device as set forth in claim 8, wherein at least one of the input directions comprises one of: a horizontal direction, a vertical direction and a diagonal direction and the other one of the input directions comprises a flow-able shape input.

10. The wireless communications device as set forth in claim 9, wherein the flow-able shape comprises one of: a circle, a square, a triangle, a zig-zag and a squiggle.

11. The wireless communications device as set forth in claim 8, wherein the graphical user interface is configured to create a number of customizable content groups, each of the customizable content groups comprising a mixed-content page, the mixed content page comprising content located in different content groups.

12. The wireless communications device as set forth in claim 11, wherein the graphical user interface is configured to cause a first customizable content group to display in response to an input of a first shape and a second customizable content group to display in response to an input of a second shape.

13. The wireless communications device as set forth in claim 8, wherein the graphical user interface is configured to assign at least one of: a unique color; and a title to each content group.

14. The wireless communications device as set forth in claim 13, wherein the graphical user interface is configured to assign the at least one of: the unique color of the content group; and the title the content group, to content within the content group.

15. For use in a wireless communications device, method for managing a display of content on a touch screen display of the wireless communications device, the method comprising:
    displaying first similar content items of a first content group, the first similar content items comprising a plurality of applications displayed continuously in at least a radial direction;

in response to receiving a first touch input in a first direction, discontinuing display of at least a portion of the first similar content items and displaying second similar content items of a second content group, the second similar content items comprising a plurality of applications displayed continuously in at least a radial direction;

in response to receiving a second touch input in a second direction, changing the second similar content items of the second content group; and in response to receiving a third touch input, displaying a customizable content group comprising at least a portion of the first similar content items and a portion of the second similar content items.

16. The method as set forth in claim 15, wherein at least one of the touch input directions comprises one of: a horizontal direction, a vertical direction and a diagonal direction and the other one of the input touch directions comprises a flow-able shape input, and wherein the flow-able shape comprises one of: a circle, a square, a triangle, a zig-zag and a squiggle.

17. The method as set forth in claim 15, creating a number of customizable content groups, each of the customizable content groups comprising a mixed-content page, the mixed content page comprising content located in different content groups.

18. The method as set forth in claim 17, displaying a first customizable content group in response to receiving an input of a first shape; and displaying a second customizable content group in response to an input of a second shape.

19. The method as set forth in claim 15, assigning at least one of: a unique color; and a title to each content group.

20. The method as set forth in claim 19, wherein assigning further comprises: assigning the at least one of: the unique color of the content group; and the title the content group, to content within the content group.

* * * * *